US011873660B2

(12) United States Patent
Peabody et al.

(10) Patent No.: US 11,873,660 B2
(45) Date of Patent: Jan. 16, 2024

(54) ELECTRIC DOOR STRIKE KEEPER

(71) Applicant: Hanchett Entry Systems, Inc., Phoenix, AZ (US)

(72) Inventors: Joshua T. Peabody, Phoenix, AZ (US); Dominik Scheffler, Phoenix, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 120 days.

(21) Appl. No.: 17/117,250

(22) Filed: Dec. 10, 2020

(65) Prior Publication Data

US 2021/0087849 A1 Mar. 25, 2021

Related U.S. Application Data

(63) Continuation of application No. 15/948,616, filed on Apr. 9, 2018, now Pat. No. 11,268,298, which is a (Continued)

(51) Int. Cl.
*E05B 15/02* (2006.01)
*E05B 47/00* (2006.01)
*E05B 47/06* (2006.01)

(52) U.S. Cl.
CPC ........ *E05B 15/022* (2013.01); *E05B 47/0047* (2013.01); *E05B 47/0004* (2013.01); (Continued)

(58) Field of Classification Search
CPC ............... E05B 15/022; E05B 47/0047; E05B 47/0004; E05B 47/0046; E05B 47/0696; (Continued)

(56) References Cited

U.S. PATENT DOCUMENTS 1,059,530 A * 4/1913 Dupuis ............... E05B 15/0245 292/341.19
1,555,830 A 10/1925 Carroll
(Continued)

FOREIGN PATENT DOCUMENTS

DE 10116299 10/2002
DE 202004007910 7/2004
(Continued)

OTHER PUBLICATIONS

Novo-Verde, Tanya, CIPO "Office Action", dated Jun. 29, 2021 for Canadian Application No. 3,054,232, Canadian Intellectual Property Office, Gatineau, Quebec.
(Continued)

*Primary Examiner* — Christine M Mills
*Assistant Examiner* — Faria F Ahmad
(74) *Attorney, Agent, or Firm* — Woods Oviatt Gilman LLP; Dennis B. Danella, Esq.

(57) ABSTRACT

An actuator-controlled electric strike for operating in conjunction with a spring latch of a lockset is provided. The strike comprises a housing having an entry chamber therein, and a spring latch keeper disposed in the entry chamber for movement between a keeper locked position and a keeper unlocked position. The spring latch keeper includes a keeper face, a second surface recessed from the keeper face and a contact ridge between the keeper face and second surface. The keeper face is contactable by the spring latch when the spring latch keeper is in the keeper locked position. The contact ridge, disposed at a non-perpendicular angle with the rotational axis of the keeper is contactable by the spring latch as the keeper moves toward its unlocked position so that a contact point on said spring latch changes as said spring latch exits said entry chamber.

6 Claims, 12 Drawing Sheets

Related U.S. Application Data continuation of application No. 13/919,517, filed as application No. PCT/US2011/065198 on Dec. 15, 2011, now Pat. No. 9,945,153.

(60) Provisional application No. 61/423,657, filed on Dec. 16, 2010.

(52) U.S. Cl.
CPC ....... *E05B 47/0046* (2013.01); *E05B 47/0696* (2013.01); *Y10T 292/68* (2015.04); *Y10T 292/696* (2015.04); *Y10T 292/699* (2015.04); *Y10T 292/702* (2015.04); *Y10T 292/705* (2015.04)

(58) Field of Classification Search
CPC ............... Y10T 292/699; Y10T 292/68; Y10T 292/696; Y10T 292/702; Y10T 292/705
See application file for complete search history.

(56) References Cited

U.S. PATENT DOCUMENTS

| | | | | |
|---|---|---|---|---|
| 3,132,833 | A | 5/1964 | Schnekenburger | |
| 3,134,253 | A * | 5/1964 | O'Brien | E05B 43/005 292/341.16 |
| 3,638,984 | A | 2/1972 | Davidson | |
| 3,774,422 | A | 11/1973 | Hogan et al. | |
| RE30,263 | E | 4/1980 | Horvath | |
| 4,211,443 | A | 7/1980 | Butts et al. | |
| 4,269,050 | A | 5/1981 | Bechtiger et al. | |
| 4,626,000 | A | 12/1986 | O'Leary | |
| 4,626,010 | A | 12/1986 | Hanchett, Jr. et al. | |
| 4,687,496 | A | 8/1987 | Weber | |
| 4,984,835 | A * | 1/1991 | Vadacchino | E05B 47/0047 292/144 |
| 4,986,584 | A * | 1/1991 | Logas | E05B 47/0047 292/201 |
| 5,076,625 | A * | 12/1991 | Oxley | E05B 47/0047 292/201 |
| 5,118,150 | A | 6/1992 | Jarrett | |
| 5,118,151 | A | 6/1992 | Nicholas, Jr. et al. | |
| 5,195,792 | A | 3/1993 | Stendal | |
| 5,257,841 | A | 11/1993 | Geringer et al. | |
| 5,474,342 | A * | 12/1995 | Smith | E05B 47/0046 292/341.16 |
| 5,484,180 | A | 1/1996 | Helmar | |
| 5,595,409 | A | 1/1997 | Fier et al. | |
| 5,681,070 | A | 10/1997 | Williams | |
| 5,735,559 | A | 4/1998 | Frolov | |
| 5,757,269 | A | 5/1998 | Roth et al. | |
| 5,934,720 | A | 8/1999 | Karalius | |
| 5,990,579 | A | 11/1999 | Ricci | |
| 6,022,056 | A | 2/2000 | Cope et al. | |
| 6,082,791 | A | 7/2000 | Frolov et al. | |
| 6,581,991 | B2 | 6/2003 | Galindo | |
| 6,588,155 | B1 | 7/2003 | Theune et al. | |
| 6,634,685 | B2 | 10/2003 | Herron et al. | |
| 6,848,729 | B2 | 2/2005 | Caspi et al. | |
| 6,874,830 | B2 | 4/2005 | Bashford | |
| 6,913,299 | B1 | 7/2005 | Stendal | |
| 6,935,663 | B2 | 8/2005 | Schildwachter et al. | |
| 6,966,585 | B2 | 11/2005 | Egi et al. | |
| 7,010,947 | B2 | 3/2006 | Milo | |
| 7,144,053 | B2 | 12/2006 | Bashford | |
| 7,185,928 | B1 | 3/2007 | Liao | |
| 7,273,241 | B2 | 9/2007 | Milo | |
| 7,722,097 | B2 | 5/2010 | Schnarr et al. | |
| 8,146,866 | B2 | 4/2012 | Tenebre et al. | |
| 8,146,966 | B1 * | 4/2012 | Webb | E05B 47/0047 292/341.15 |
| 8,157,302 | B1 | 4/2012 | Webb et al. | |
| 8,783,744 | B2 * | 7/2014 | Scheffler | E05B 63/244 292/341.15 |
| 9,121,198 | B2 | 9/2015 | Gresser | |
| 10,072,441 | B2 | 9/2018 | Singh | |
| 10,501,983 | B2 * | 12/2019 | Bartholdi | E05B 15/102 |
| 10,927,568 | B2 | 2/2021 | Singh | |
| 11,193,308 | B2 * | 12/2021 | Hsu | E05B 15/022 |
| 2003/0127870 | A1 | 7/2003 | Schildwachter | |
| 2004/0061343 | A1 * | 4/2004 | Bashford | E05B 47/0047 292/341.16 |
| 2005/0184539 | A1 | 8/2005 | Milo | |
| 2006/0192397 | A1 * | 8/2006 | Schnarr | E05B 47/0047 292/341.16 |
| 2006/0226663 | A1 | 10/2006 | Liao | |
| 2007/0085354 | A1 | 4/2007 | Hirschoff | |
| 2008/0191499 | A1 | 8/2008 | Stein | |
| 2008/0224481 | A1 | 9/2008 | Geringer et al. | |
| 2009/0072555 | A1 | 3/2009 | Holzer | |
| 2009/0188289 | A1 | 7/2009 | Orbeta | |
| 2010/0038920 | A1 | 2/2010 | Tsai | |
| 2010/0078944 | A1 | 4/2010 | Hirschoff | |
| 2010/0096864 | A1 | 4/2010 | Webb et al. | |
| 2010/0109349 | A1 | 5/2010 | Peabody et al. | |
| 2010/0116006 | A1 | 5/2010 | Huang | |
| 2010/0127518 | A1 | 5/2010 | Huang | |
| 2010/0289279 | A1 | 11/2010 | Toma | |
| 2011/0031768 | A1 * | 2/2011 | Scheffler | E05B 47/0046 292/341.16 |
| 2013/0009409 | A1 | 1/2013 | Chang | |
| 2013/0088023 | A1 | 4/2013 | Singh | |
| 2014/0159395 | A1 | 6/2014 | Scheffler et al. | |
| 2018/0347235 | A1 | 12/2018 | Singh | |

FOREIGN PATENT DOCUMENTS

| | | |
|---|---|---|
| DE | 10310403 | 9/2004 |
| DE | 102004012112 | 8/2005 |
| DE | 102005015248 | 10/2006 |
| DE | 102007014324 | 10/2008 |
| DE | 102005048693 | 7/2009 |
| EP | 0851077 | 7/1998 |

OTHER PUBLICATIONS

Novo-Verde, Tanya, CIPO "Office Action", dated Jul. 15, 2021 for Canadian Application No. 3,017,249, Canadian Intellectual Property Office, Gatineau, Quebec.

Novo-Verde, Tanya, CIPO "Office Action", dated Feb. 26, 2021 for Canadian Application No. 3,017,249, Canadian Intellectual Property Office, Gatineau, Quebec.

Novo-Verde, Tanya, CIPO "Office Action", dated Mar. 31, 2021 for Canadian Application No. 3,054,232, Canadian Intellectual Property Office, Gatineau, Quebec.

Merlino, Alyson Marie, "Final Office Action", issued for U.S. Appl. No. 14/179,011, filed Feb. 12, 2014, dated Jul. 25, 2016, Alexandria, VA.

Merlino, Alyson Marie, "Non-Final Office Action", issued for U.S. Appl. No. 12/851,848, filed Aug. 6, 2010, dated May 31, 2013, Alexandria, VA.

Merlino, Alyson Marie, "Non-Final Office Action", issued for U.S. Appl. No. 12/851,848, filed Aug. 6, 2010, dated Aug. 15, 2012, Alexandria, VA.

Merlino, Alyson Marie, "Non-Final Office Action", issued for U.S. Appl. No. 14/179,011, filed Feb. 12, 2014, dated Jan. 14, 2016, Alexandria, VA.

Merlino, Alyson Marie, "Non-Final Office Action", issued for U.S. Appl. No. 14/179,011, filed Feb. 12, 2014, dated Jul. 10, 2015, Alexandria, VA.

Novo-Verde, Tanya, "Office Action", issued for CA Patent Application No. 3,002,386 filed on Apr. 23, 2018, dated Feb. 20, 2019, Quebec, CA.

Novo-Verde, Tanya, "Office Action", issued for CA Patent Application No. 3,017,249 filed on Jan. 24, 2019, dated Mar. 1, 2019, Quebec, CA.

Novo-Verde, Tanya, "Office Action", issued for CA Patent Application No. 3,017,249 filed on Jan. 24, 2019, dated Mar. 17, 2020, Quebec, CA.

(56) References Cited

OTHER PUBLICATIONS

Novo-Verde, Tanya, "Office Action", issued for CA Patent Application No. 3,017,249 filed on Jan. 24, 2019, dated Aug. 26, 2020, Quebec, CA.
Novo-Verde, Tanya, "Office Action", issued for CA Patent Application No. 3,054,232 filed on Sep. 5, 2019, dated Nov. 12, 2020, Quebec, CA.
The National Locksmith Magazine, cover, Apr. 1986.
Van Beurden, Jason, "PCT International Search Report", dated Jul. 17, 2014 for application No. PCT/US2011/065198, European Patent Office, Rijswijk, NL 2280.
Van Beurden, Jason, "Written Opinion of the International Searching Authority", dated Jul. 17, 2014 for application No. PCT/US2011/065198, European Patent Office, Rijswijk, NL 2280.
Ahmad, Faria F., "Final Office Action", issued for U.S. Appl. No. 13/919,517, filed Aug. 26, 2013, dated May 6, 2016, Alexandria, VA.
Ahmad, Faria F., "Final Office Action", issued for U.S. Appl. No. 13/919,517, filed Aug. 26, 2013, dated Jul. 27, 2017, Alexandria, VA.
Ahmad, Faria F., "Non-Final Office Action", issued for U.S. Appl. No. 13/919,517, filed Aug. 26, 2013, dated Jan. 12, 2017, Alexandria, VA.
Ahmad, Faria F., "Non-Final Office Action", issued for U.S. Appl. No. 13/919,517, filed Aug. 26, 2013, dated Oct. 6, 2015, Alexandria, VA.
Hanchett Entry Systems, Inc., "Installation Instructions for the 9000 Series Strike", 4 pages, Feb. 1986.
Hanchett Entry Systems, Inc., "Price List for 9000 Series Electric Strike", 2 pages, Jan. 1986.
Locksmith Ledger Magazine, p. 113-114, Feb. 1986.
Ocksmith Ledger Magazine, p. 52, Dec. 1986.
Merlino, Alyson Marie, "Final Office Action", issued for U.S. Appl. No. 12/851,848, filed Aug. 6, 2010, dated Mar. 13, 2013, Alexandria, VA.
Merlino, Alyson Marie, "Final Office Action", issued for U.S. Appl. No. 12/851,848, filed Aug. 6, 2010, dated Mar. 20, 2014, Alexandria, VA.
Ahmad, Faria F., "Non-Final Office Action", issued for U.S. Appl. No. 15/948,616, filed Apr. 9, 2018, dated Jun. 15, 2021, Alexandria, VA.

* cited by examiner

ELECTRIC DOOR STRIKE KEEPER

CROSS-REFERENCE TO RELATED APPLICATIONS

This application is a continuation of U.S. patent application Ser. No. 15/948,616, filed on Apr. 9, 2018, which is a continuation of U.S. patent application Ser. No. 13/919,517, filed Jun. 17, 2013, now U.S. Pat. No. 9,945,153, which is a National Stage filing under 35 U.S.C. § 371 of International Application No. PCT/US2011/065198, filed Dec. 15, 2011, which in turn claims the benefit of U.S. Provisional Application No. 61/423,657, filed on Dec. 16, 2010, which are hereby incorporated by reference in their entirety.

TECHNICAL FIELD

The present invention relates to strike mechanisms for electrically locking or unlocking a door in a frame; more particularly, to such strike mechanisms wherein a mortise-type lockset having a spring latch and dead latch is electrically retained or released by the strike; and most particularly, to an electrically-controlled strike having a pivotable spring latch keeper, a spring latch lifter feature, and a pivotable dead latch release platform that cooperate in synchronized motion to lift and release a spring latch from the strike. In one aspect of the invention, the spring latch lifter feature pivots and is directly driven by rotation of the spring latch keeper to lift the spring latch out of the latch entry chamber. In another aspect of the invention, the spring latch lifter feature is an internal ramp, whose surface aligns with a nose of the keeper, and an external ramp to form a continuous incline and to lift the spring latch out of the latch entry chamber when the door is moved in an opening direction.

BACKGROUND OF THE INVENTION

As is known in the art of door latching, typically an electrically-controlled strike is mounted in a frame portion of a door and engages a mortise-type lockset disposed on or in an edge portion of the door. Typically, the mortise-type lockset includes a spring latch and a dead latch that is linearly spaced-apart from the spring latch along the edge portion of the door. The spring latch is reciprocally moveable between an engaged position so that it can engage an entry chamber in the strike, thereby to secure the door in a closed state, and a released position, wherein the door is released from the closed state and is free to open. The dead latch is reciprocally moveable between an enabling position (extended) that permits movement of the spring latch from its engaged position to the released position and a disabling position (depressed) that prohibits movement of the spring latch from its engaged position to its release position. The spring latch is resiliently biased into an engaged position and the dead latch is resiliently biased into the enabled position. (When the dead latch is in the enabled, extended position, the spring latch is able to be depressed from its engaged position).

U.S. Pat. No. 6,581,991 B2, the relevant disclosure of which is incorporated herein by reference, discloses an electrically-controlled strike comprising a housing adapted to be mounted in a frame portion of a door and having a cavity with a forwardly disposed opening that is sized and adapted to receive a spring latch and a dead latch when the door is in the closed state. The invention provides a single electrically actuated door latch structure that can be customized to a variety of spring latch and dead latch arrangements.

U.S. patent application Ser. No. 12/851,848, filed Aug. 6, 2010 and assigned to Hanchett Entry Systems, Inc. discloses an improved door strike having a spring latch kicker and a dead latch release platform which can be adjusted to various positions in conjunction with the specific mortise lockset used. A rectangular housing is disposable within the frame of a door pivotably mounted in the frame. The housing includes an elongate opening defining an entry chamber for a spring latch and a dead latch of a mortise lockset in the door. An entrance ramp for the spring latch and dead latch extends from an edge of the housing. A keeper is pivotably mounted within the chamber to selectively engage and retain the spring latch. A kicker is also pivotably mounted within the chamber and is interlocked with the keeper and engageable by the spring latch. A dead latch release platform is also pivotably mounted within the chamber and is supported at an opposite end by the keeper when the spring latch is secured within the strike. When a release command is received, the keeper is allowed by means of an actuator, such as a solenoid, to rotate and then rotates, from a door-opening force, against the force of its return spring into a position from which the spring latch may be ramped out of the strike opening. The keeper rotation allows the dead latch release platform to pivot into the cavity against the force of a release platform return spring, thereby releasing the dead latch to be extended into the cavity which allows the spring latch to be ramped out as it is depressed into the door. The pivot action of the keeper and a leg of the keeper acting directly on the kicker causes the kicker to engage the nose of the spring latch and to boost the spring latch onto a ramp surface formed on a face of the keeper. The spring latch then leaves the kicker, climbs the ramp surface and exits the strike as the door opens in the frame. After the spring latch has cleared the strike, the keeper rotates to its lock position under the force of its return spring, the dead latch release platform returns to a position supported by the keeper under the force of its return spring so that the dead latch is held in its depressed position by the supported dead latch release platform upon closing the door.

The dead latch release platform can be installed in any of a plurality of different vertical (along the long dimension of the housing) locations in the housing opening to accommodate any of a plurality of different lockset arrangements.

What is needed in the art is an electrically-controlled strike wherein the dead latch release platform is positively driven by the keeper to its return position in preparation for relatching of a door.

What is further needed is a strike wherein a spring latch lifter feature includes (1) a pivotable member that is driven by the keeper to positively and continuously push the spring latch onto the exit ramp during unlatching of the door, or (2) an internal ramp to form a continuous incline whose surface aligns with a ramped nose of the keeper and an external ramp to lift the spring latch out of the entry chamber when the keeper releases the spring latch and the door is moved in an opening direction.

Still further what is needed is a angularly disposed ridge on said ramped nose of the keeper that is contactable by the spring latch as the keeper releases the spring latch to facilitate ascension of the spring latch from the strike cavity.

It is a principal object of the present invention to reduce the cost and complexity of an electrically-controlled strike for a door with a mortise lockset and to improve reliability of operation.

SUMMARY OF THE INVENTION

Briefly described, an electrically-controlled strike in accordance with the present invention comprises a rectangular housing disposable within the frame of a door wherein said door is pivotably mounted in the frame. The housing includes an elongate entry chamber for a spring latch and a dead latch of a lockset in the door. (For purpose of explanation, the entry chamber should be considered as having a bottom, sides, outer corners adjacent the opening of the entry chamber, and inner corners at the juncture of the sides and bottom of the entry chamber.) An external ramp for the spring latch, and with some mortise locksets also for the dead latch, extends from an edge of the entry chamber. A curved keeper is pivotably mounted at an intermediate point within the chamber to selectively engage and retain the spring latch in the chamber. A dead latch release platform is pivotable on a platform bracket mounted within the chamber at an inner corner thereof and, by rotation of the spring latch keeper, is allowed to rotate in a first direction to permit extension of the dead latch. Rotation of the spring latch keeper in a second return direction positively drives the dead latch release platform to its initial position to depress the dead latch into the door. A spring latch lifter feature is also present in accordance with the invention. In one aspect of the spring latch lifter feature design, a spring latch lifter is pivotable on a spring latch lifter bracket mounted within the chamber near an outer corner thereof and is interlocked with the keeper for engaging the spring latch. The motion of the spring latch lifter in a first direction is positively controlled by the motion of the keeper. The spring latch lifter returns to its initial position by a return spring. In another aspect of the invention, the spring latch lifter feature is an internal ramp that aligns with a ramp surface on the spring latch keeper and an external ramp surface to form a continuous incline and to lift the spring latch out of the entry chamber when the door is moved in an opening direction.

When a release command is received, the keeper is released by means of an actuator, such as a solenoid, and may be rotated by an opening force on the door into a position from which the spring latch may be ramped out of the strike opening. The keeper rotation allows the dead latch release platform to pivot into the entry chamber, which further allows the dead latch to extend into the entry chamber, which still further allows the spring latch to be ramped outwards of the entry chamber into the door. In one aspect of the design, the pivot action of the keeper also causes the spring latch lifter to engage the nose of the spring latch and then to continuously push the spring latch out of the entry chamber of the housing and onto the external ramp of the strike. The spring latch then exits the strike over the entrance ramp as the door opens in the frame. The spring latch lifter can be installed in multiple locations within the housing to accommodate differing lockset arrangements.

In another aspect of the design, instead of the spring latch lifter positively pushing the spring latch out of the entry chamber, a three-part ramp contact surface is formed with the inclusion of the internal ramp thereby providing a continuous incline surface for the tip of the spring latch to first contact. The incline causes the spring latch to ride up its ramp surface and ascend out of the entry chamber as the door opens in the frame. Means are also provided so that the position of the internal ramp may accommodate differing lockset arrangements.

In yet a further aspect of the invention, to encourage the spring latch to retract and to ascend smoothly out of entry chamber once the keeper is rotated to its unlatched position, a spring latch contact ridge is provided. A second surface recessed from the keeper face of the keeper forms the spring latch ridge between the second surface and the keeper face. The contact ridge generally runs at a non-perpendicular angle relative to the axis of rotation of the keeper. As the spring latch ascends from entry chamber, the angularly disposed latch contact ridge provides a contact point on the tip of the spring latch whereby the contact point changes along the tip as the contact point moves laterally across the length of the spring latch tip. Since the contact point is changing as the spring latch exits the entry chamber, the tendency of the spring latch to dig-in and stick against the keeper as the spring latch exits the entry chamber is diminished, causing the spring latch to ascend smoothly out of the entry chamber.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

The present invention is broadly directed to an automated door latch release system that is adapted to be installed in a door jamb or frame so that it can operate with a mortise-type lock with a separate dead latch assembly such as those found in typical commercial and industrial applications. The present invention also encompasses a method for automated door release. The present invention is particularly adapted for use with security doors in industrial and commercial applications wherein the security system can be electronically activated to release the door so that it may be moved from a secured, or locked, first door position wherein it is secured within the door jamb to an open, or unlocked, second door position. The automated door lock release, also referred to herein as an "electrically-controlled strike," is primarily adapted for use with a mortise-type lock assembly mounted in the door. A typical mortise-type dead latch assembly includes a spring latch and a dead latch that are spaced-apart from one another along the edge of the door. The present invention is specifically adapted to be mounted in the dimensions of a typical door jamb to interface with a variety of different styles of mortise-type dead locks. Further, with the benefits provided by the present invention, the cut-out in the door jamb need not be modified to receive the electric door strike.

An automated door lock release or strike in accordance with the present invention is an improvement over the prior art automated door latch releases described hereinabove and is intended to function as a direct replacement thereof.

Figure 1:
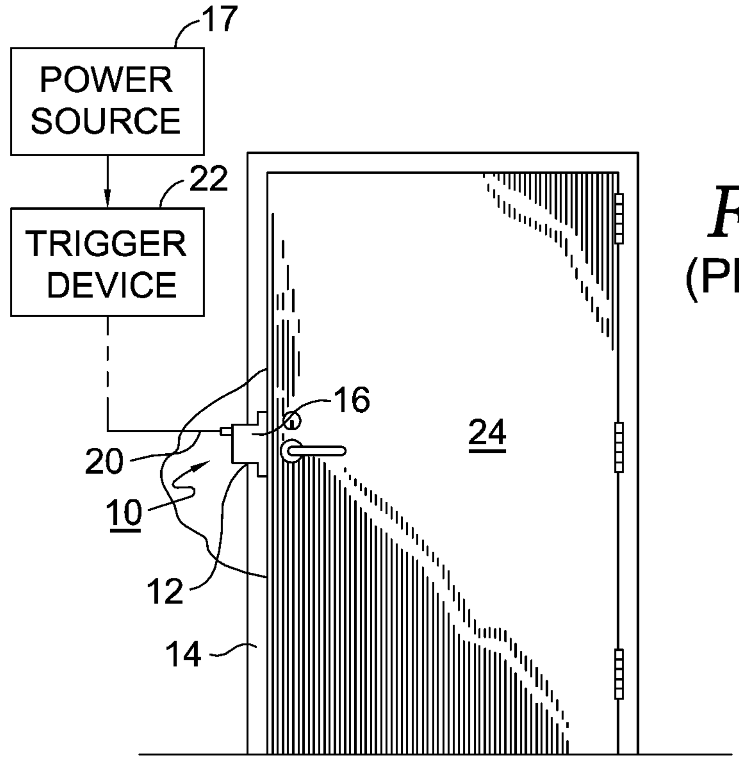
FIG. 1. (PRIOR ART)
FIG. 1 is a front elevational view of a door in a secure condition at a first door position (door closed) within a door frame and having a portion of the door frame broken away to show an electrically-controlled strike operable with a mortise-type lock assembly in the door.
Figure 3:
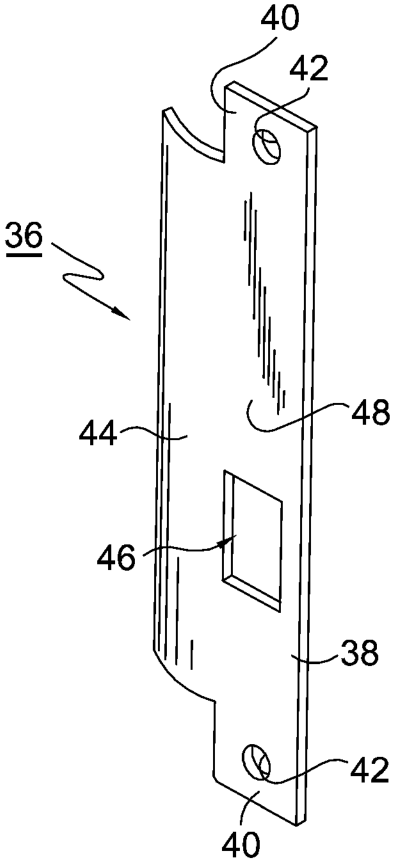
FIG. 3. (PRIOR ART)
FIG. 3 is a perspective view of a strike plate according to the prior art for use with a mortise-type dead latch assembly such as that shown in FIG. 2 which would be replaced by an electrically-controlled strike in accordance with the present invention.
Figure 2:
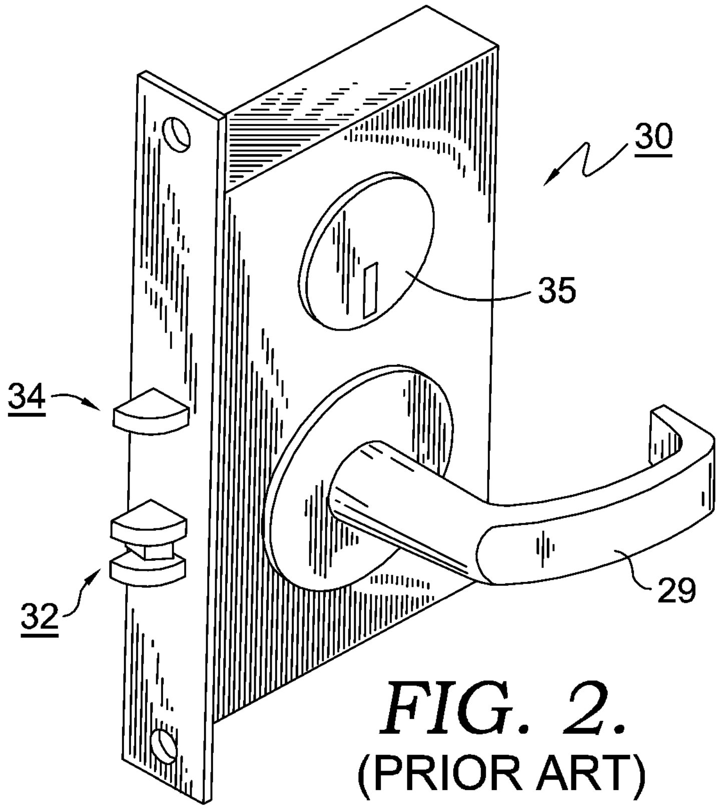
FIG. 2. (PRIOR ART)
FIG. 2 is an isometric view of a prior art mortise lockset for use with an electrically-controlled strike in accordance with the present invention.
Figure 4:
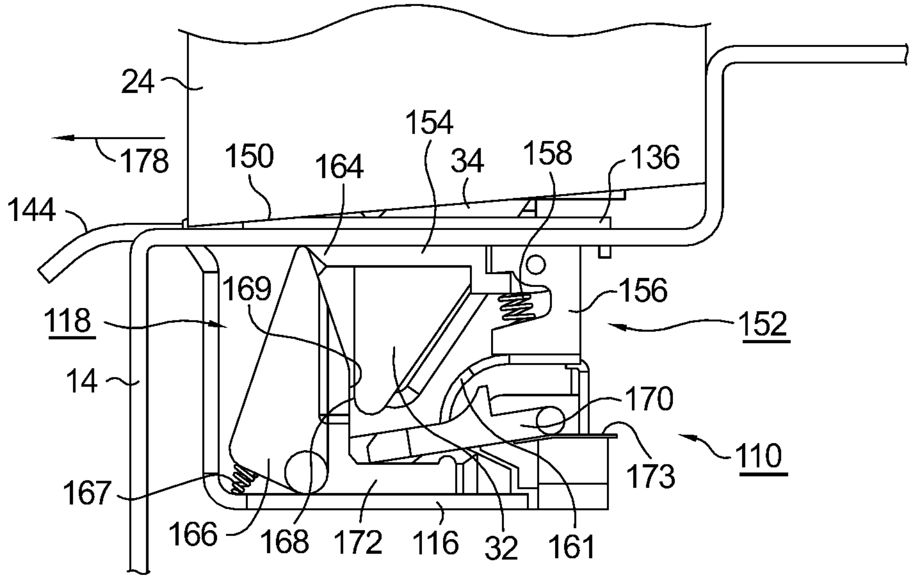
FIG. 4. (PRIOR ART)
FIG. 4 is a cross-sectional view showing a door having a mortise lockset latched in a frame having a prior art electrically-controlled strike, the strike being in secured mode.
Figure 5:
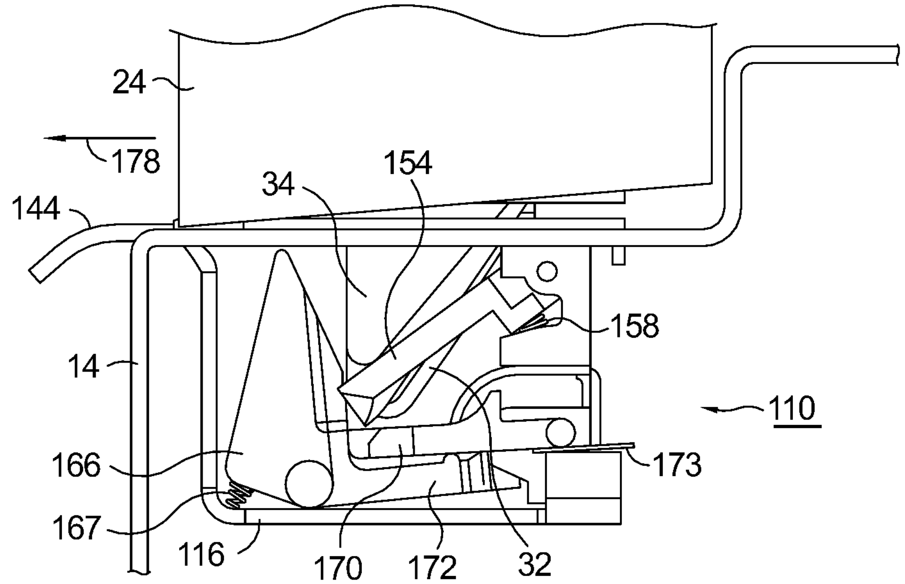
FIG. 5. (PRIOR ART)
FIG. 5 is a cross-sectional view sequential to the view shown in FIG. 4, showing the prior art strike in an early stage of unlocking the spring latch and dead latch of the mortise lockset.
Figure 6:
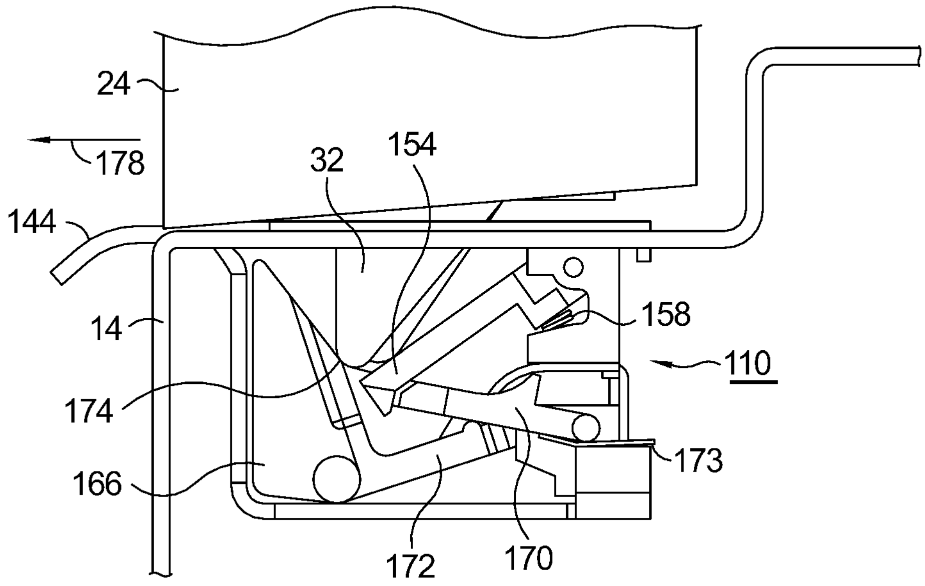
FIG. 6. (PRIOR ART)
FIG. 6 is a cross-sectional view sequential to the view shown in FIG. 5, showing the prior art strike in a later stage of unlocking the spring latch and dead latch of the mortise lockset.
Figure 7:
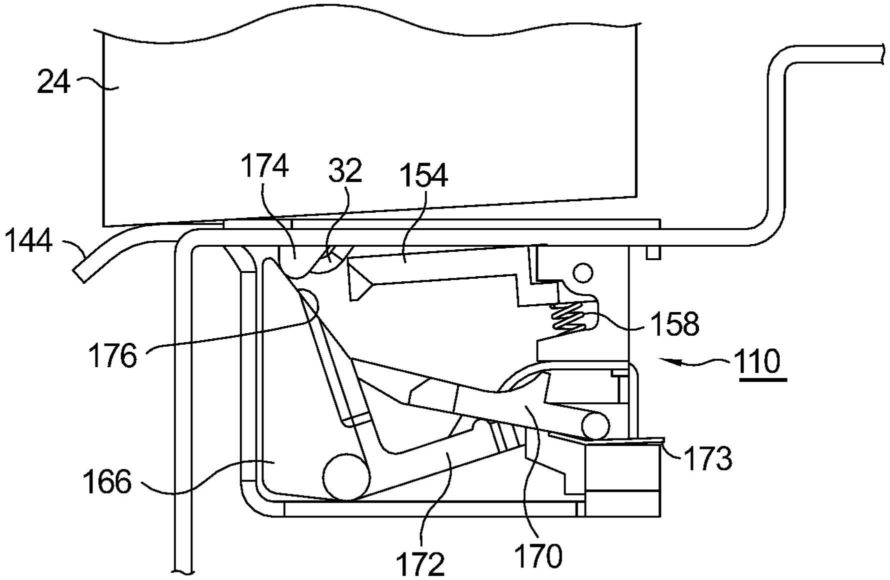
FIG. 7. (PRIOR ART)
FIG. 7 is a cross-sectional view sequential to the view shown in FIG. 6, showing the prior art strike in a late stage of unlocking the spring latch and dead latch of the mortise lockset.

Referring to FIGS. 1 through 3, for purposes of comparison an electric door strike assembly disclosed in U.S. Pat. No. 6,581,991 B2 comprises an automated door latch release 10 that is received in a cavity 12 in a typical door frame 14. Actuator 10 includes an outer housing 16 that mounts its electrical and mechanical components. The electrical components in turn are electrically energized by means of wiring 20. Actuator 10, for example, may be electrically in communication with a source 17 of electrical power such as for example, a 12 or 24 volt circuit, and with a trigger device 22. Activation of the trigger device causes the door latch actuator to activate. The trigger device 22 typically is a switch whose contacts selectively actuate the door latch actuator. The trigger device 22 may be incorporated into a control entry device such as a card reader or digital entry keypad wherein an authorized card is presented or an authorized code is entered into trigger device 22.

A typical door 24 is shown in FIG. 1 in a first or closed position and is pivotably mounted to move in frame 14 between a closed position and an open position.

Door latch release 10 is constructed to interface with a mortise-type lockset assembly 30 according to the prior art, exemplarily shown in FIG. 2. A prior art mortise-type lockset assembly 30 includes a spring latch 32 and a dead latch 34. Spring latch 32 and dead latch 34, when mounted in a door, are linearly spaced-apart from one another along the edge portion of the door. Both spring latch 32 and dead latch 34 are spring-biased to extend outwardly from lockset assembly 30. Thus, as one of ordinary skill in the art can appreciate, spring latch 32 is slideably moveable between an advanced or "engaged position", wherein the spring latch 32 is fully extended from the edge portion of the door such that it can engage the latch bolt receiving cavity 46 (FIG. 3), and a retracted or "release position" wherein spring latch 32 is retracted into the door and becomes disengaged from the latch bolt receiving cavity 46, allowing the door to open.

Dead latch 34 similarly is reciprocally moveable between an extended or "enabling position" (enables depression of spring latch) and a depressed or "disabling position". As is known in the prior art, when the dead latch is held in its disabling position, the spring latch bolt is prevented from moving from the engaged position to the release position. However, when the dead latch is allowed to extend into its enabling position within cavity 46, the spring latch may reciprocate between the engaged position and the release position. In FIG. 2, dead latch 34 is shown in the extended or enabling position and spring latch 32 is shown in the engaged position. In this position of dead latch 34, spring latch 32 is free to be urged into lockset assembly 30 in response to an opening force on door 24 as by a user rotating the door handle 29.

With reference now to FIG. 3, a prior art strike plate 36 for use with mortise-type locksets of the prior art, such as lockset assembly 30, includes a rectangular central body portion 38 having oppositely projecting mounting tabs 40 provided with holes 42 adapted to receive screws for mounting on door frame 14. A lateral flange 44 projects away from central body portion 38 in a slightly curved configuration so as to interact as a ramp with the curved edges of spring latch 32 and dead latch 34 when the door swings shut, driving both spring latch 32 and dead latch 34 into door 24. Latch bolt receiving cavity 46, in the form of an opening, is provided in central body portion 38 of strike plate 36 so that, when the door fully closes, spring latch 32 extends into receiving cavity 46 to hold the door in the closed position. Dead latch 34, on the other hand, continues to bear against the surface of strike plate 36 in the region designated 48 and is held in the depressed or disabling position thereby to lock the door. However, and with reference to FIG. 2, mortise-type lockset assembly 30 typically includes a key lock 35 that includes a mechanism to selectively retain spring latch 32 in the engaged position or to release spring latch 32 so that it may move between the engaged position and the release position without extension of the dead latch. This arrangement is well known to those skilled in the art and is not part of the present invention.

Referring now to FIGS. 4 through 7, for comparison purposes, electrically-controlled strike 110 in accordance with the device disclosed in U.S. patent application Ser. No. 12/851,848 comprises a housing 116 defining an entry chamber 118 therein. Strike plate 136 having a central cutout portion 150 is adapted to fit over housing 116. Housing 116 is provided along an edge with a lateral flange 144 preferably running substantially the full longitudinal length of housing 116, that serves as an entry ramp for a spring latch and dead latch arrangement as described below.

A dead latch release subassembly 152 comprises a dead latch release platform 154 pivotably disposed in mount 156 mounted to housing 116 at an outer corner of entry chamber 118. A compression spring 158 is disposed between platform 154 and mount 156 to resiliently urge subassembly 152 into the configuration shown in FIGS. 4 and 7.

A spring latch keeper 166 is pivotably mounted longitudinally of housing 116 at the bottom of entry chamber 118 and, in the locked position (FIG. 4), engages nose tang 164 to support dead latch release platform 154. Thus, when door lockset assembly is in the locked mode, dead latch 34 is held in a depressed position within the door lockset assembly by dead latch release platform 154. Surface 169 of keeper 166 further engages lockset spring latch 32 along surface 168. The door opening force is applied in direction 178 substantially perpendicular to surface 169, thus preventing door 24 from being opened. A return spring 167 disposed between keeper 166 and housing 116 urges keeper 166 toward the locked position shown in FIG. 4.

A kicker 170 is also pivotably mounted longitudinally of housing 116 and rests against a leg 172 of keeper 166. A return spring 173 is mounted on kicker 170 and constrained by housing 116. A solenoid (not visible) is linearly operative against keeper 166 to selectively permit rotation of the keeper when an unlocked mode (FIGS. 6 and 7) for mechanism 110 is desired.

Figure 8:
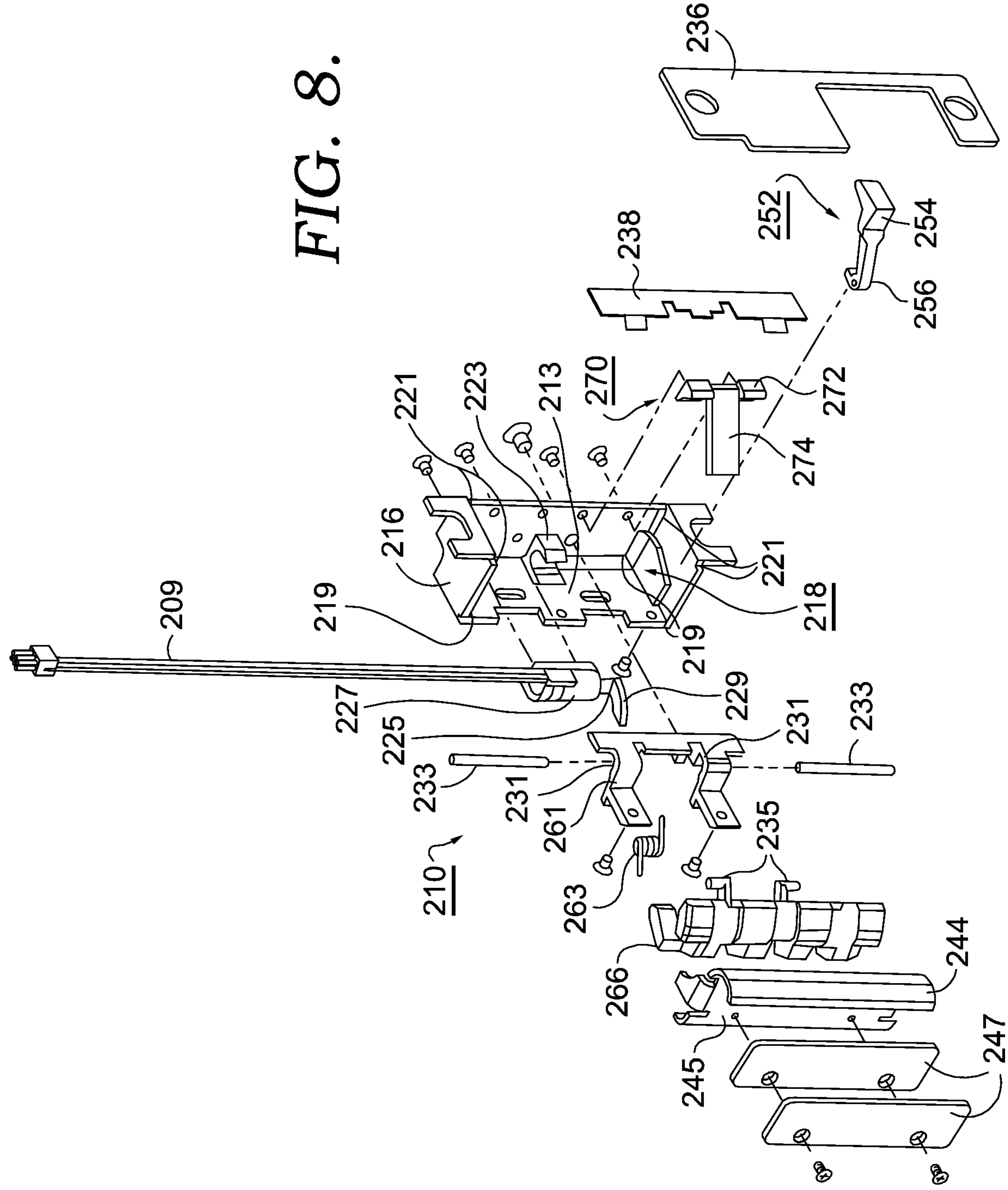
FIG. 8 is an exploded isometric view of an electric door strike in accordance with the present invention.
Figure 9:
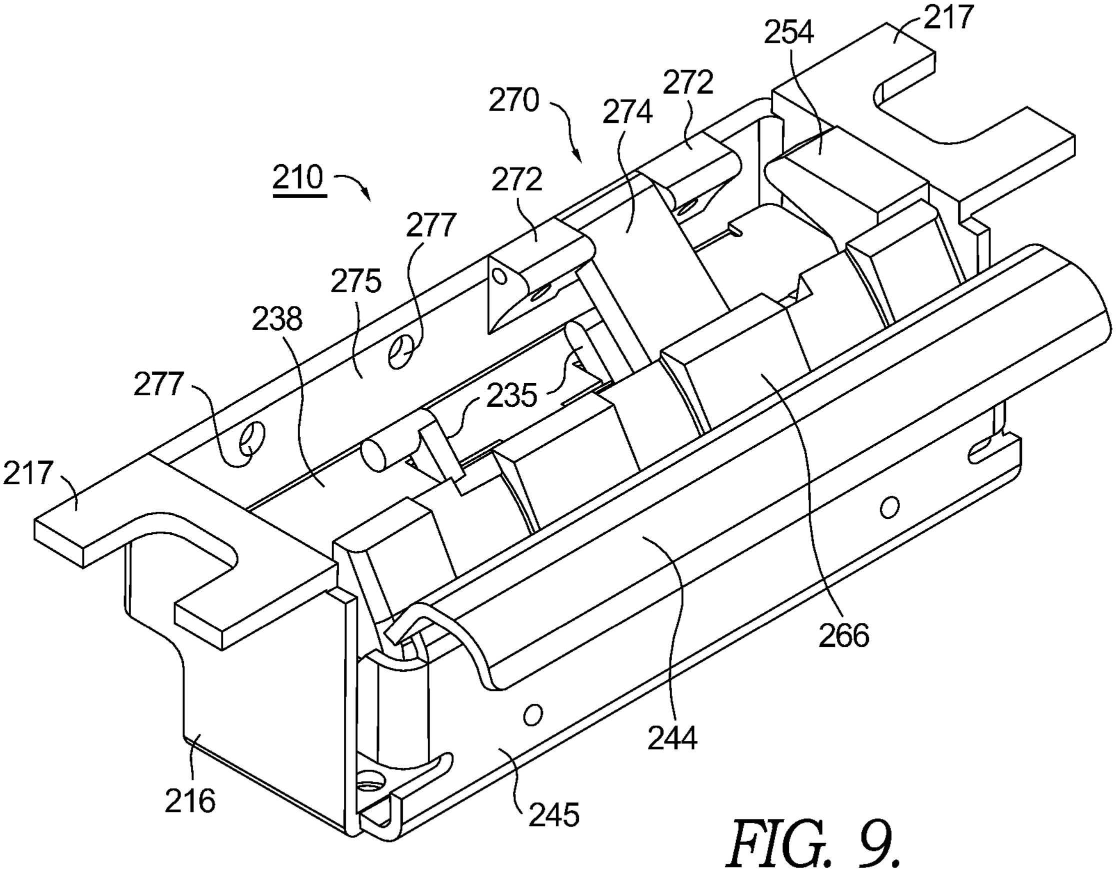
FIG. 9 is an isometric view from above of the electric door strike shown in FIG. 8 with the faceplate omitted for clarity.

Referring now to FIGS. 8 and 9, an electric door strike 210 in accordance with the present invention comprises a housing 216 having first and second mounting flanges 217 for receiving a strike plate 236 and a shield 238. Housing 216 defines an entry chamber 218 having inner corners 219 and outer corners 221. A saddle 223 receives a plunger 225 of a linear solenoid 227 mounted in entry chamber 218 and connected electrically to leads 209. A blocker 229 is associated with plunger 225. A dead latch release subassembly 252 comprises a dead latch release platform 254 pivotably disposed in base 256 mounted to housing 216 at an inner corner 219. A keeper bench 261 is mounted to housing 216 and comprises first and second journal bearings 231 for receiving first and second keeper pivot pins 233. Keeper 266 is pivotably mounted to keeper bench 261 on pins 233 at an intermediate position off-spaced from bottom 213 of housing. Keeper 266 includes at least one lifter actuation arm 235. Bias spring 263 is also mounted on one of pins 233 for returning keeper 266 to the starting position after the unlocked spring latch has cleared the strike. External ramp 244 also comprises a closing wall 245 of housing 216. First and second shims 247 may be included to position strike 210 correctly in a door frame cavity of a specific installation. A lifter subassembly 270 comprises a lifter pivot bracket 272 mounted to a wall 275 of housing 216 at an outer corner 221 thereof and a lifter 274 pivotably mounted in lifter pivot bracket 272. As shown in FIG. 9, lifter pivot bracket 272 (and lifter subassembly 270) may be selectively positioned along wall 275 via threaded mounting holes 277 to align with a variety of dead latch positions.

Figure 10:
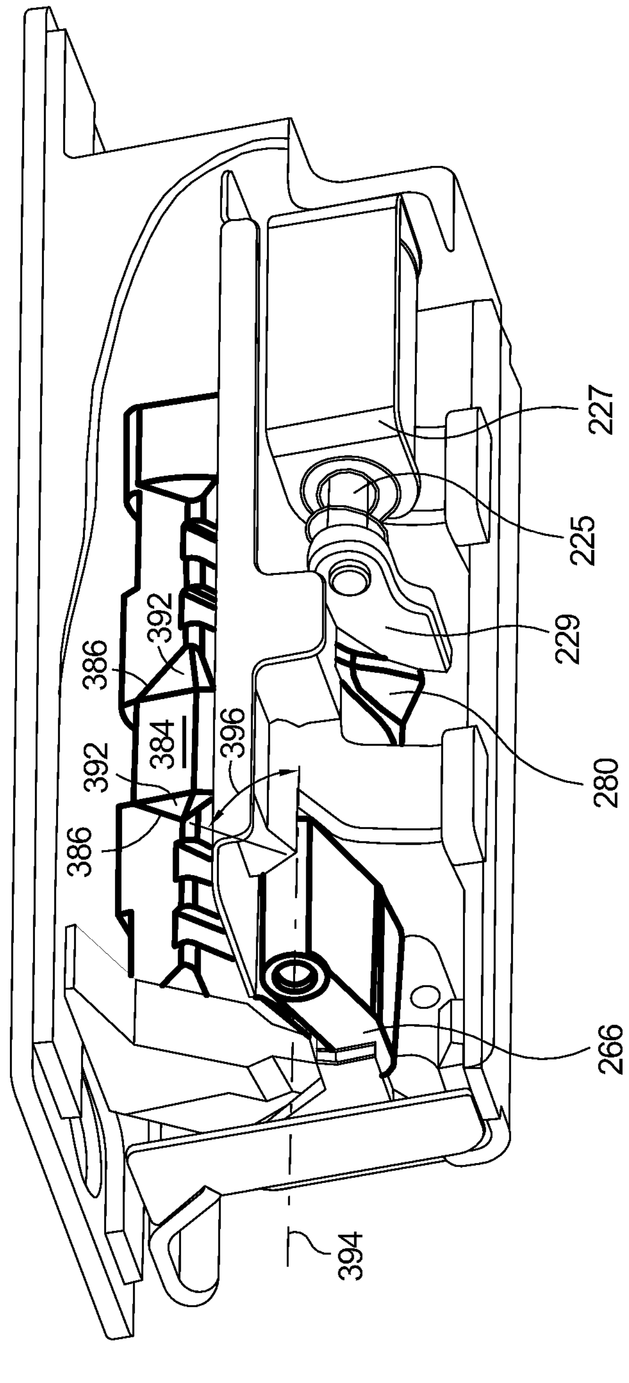
FIG. 10 is a first isometric view from below of the electric door strike shown in FIG. 9 with portions of the housing broken away for clarity, showing the strike in the locked position.
Figure 11:
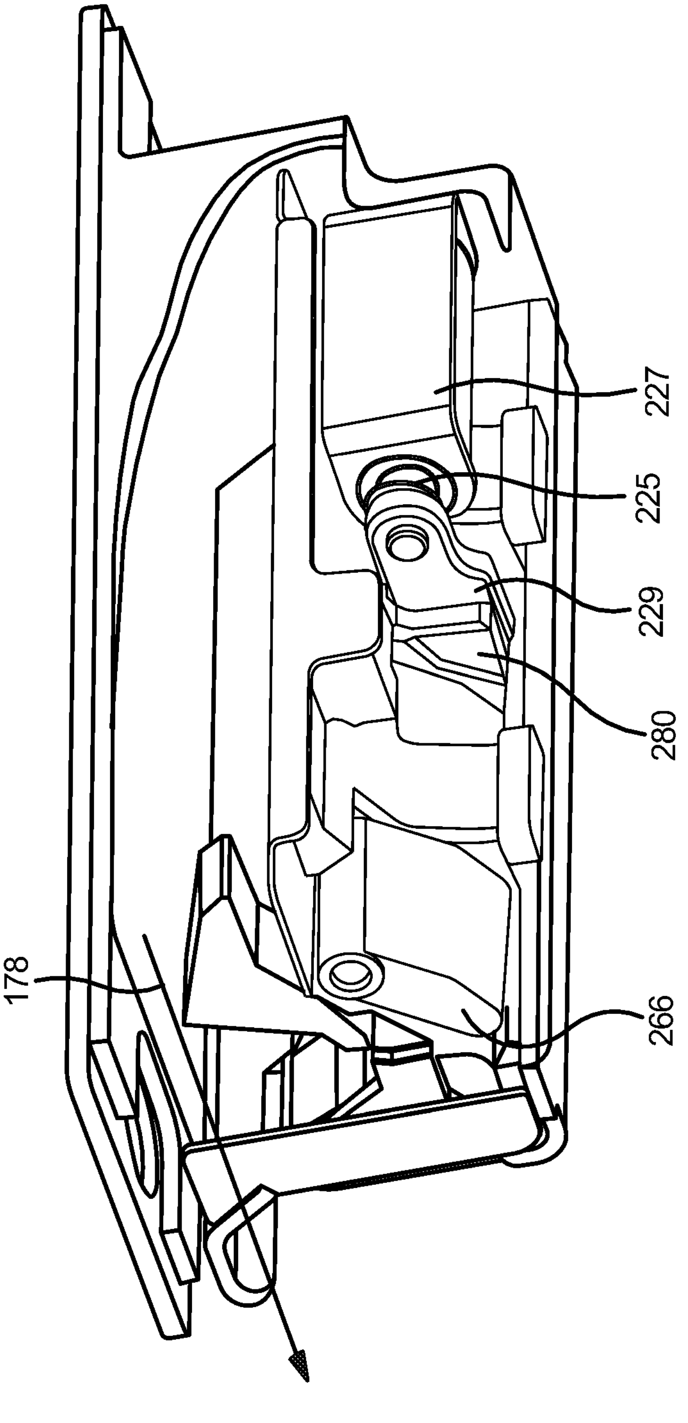
FIG. 11 is a second isometric view like that shown in FIG. 10, showing the strike in the unlocked position.

Referring now to FIGS. 10 and 11, a strike locking and unlocking mechanism is shown in accordance with the present invention.

In locked position, as shown in FIG. 10, solenoid plunger 225 is extended from solenoid 227, placing blocker 229 in the rotational path of keeper tang 280. In this locked position of keeper 266, as described further below, a spring latch (not shown) captured within strike 210 is prevented from being able to leave entry chamber 218 of strike 210.

In unlocked position, shown in FIG. 11, solenoid plunger 225 is retracted by solenoid 227, displacing blocker 229 from the rotational path of keeper tang 280. In this unlocked position of keeper 266, as described further below, a spring latch (not shown) captured within chamber 218 of strike 210 is able to cause keeper 266 to be rotated to the position shown and the spring latch is thus able to leave chamber 218 of the strike in response to door-opening force in direction 178.

Figure 12:
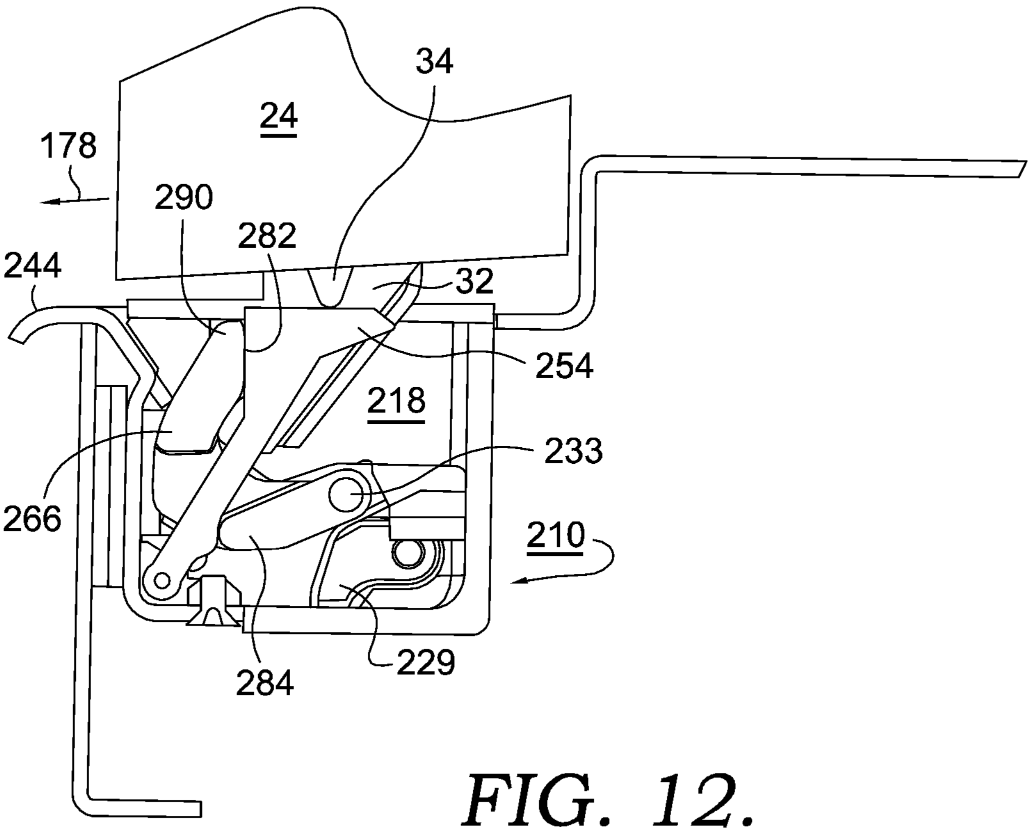
FIG. 12 is a first end view of the strike as shown in FIG. 10, showing the strike in a locked position.
Figure 13A:
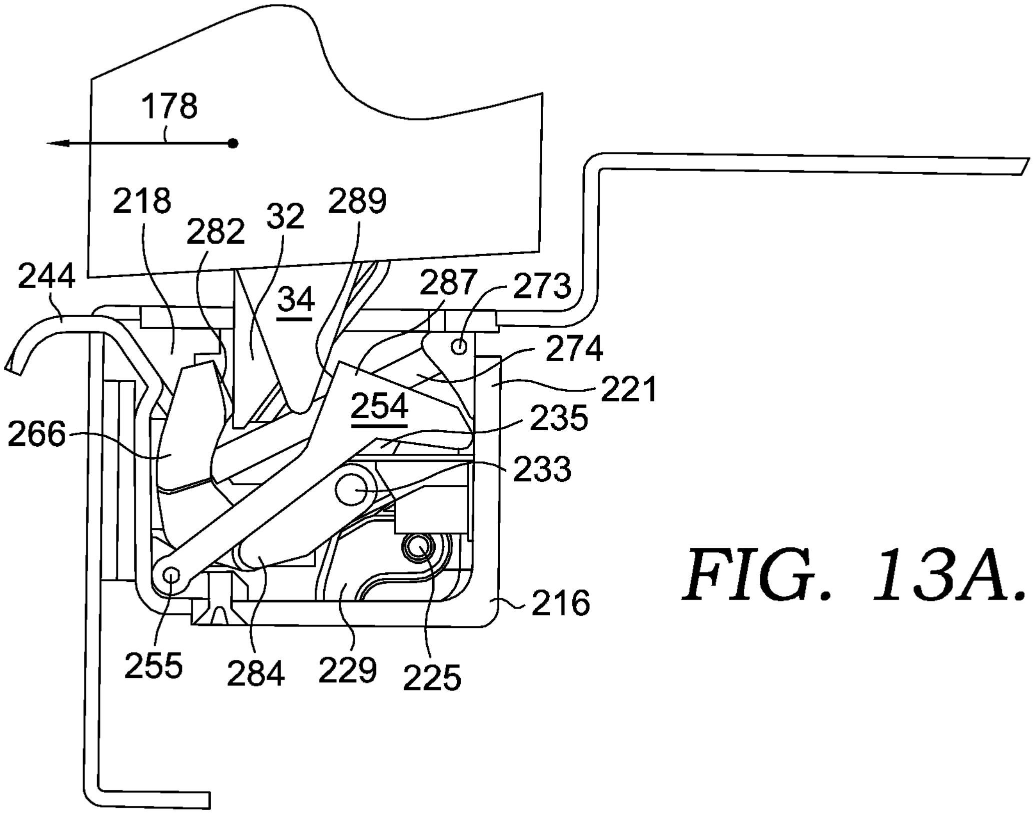
FIGS. 13A and 13B are second end views similar to that shown in FIG. 12, showing the strike at a midpoint during release of the spring latch (the dead latch release platform is removed from FIG. 13B, for clarity)
Figure 13B:
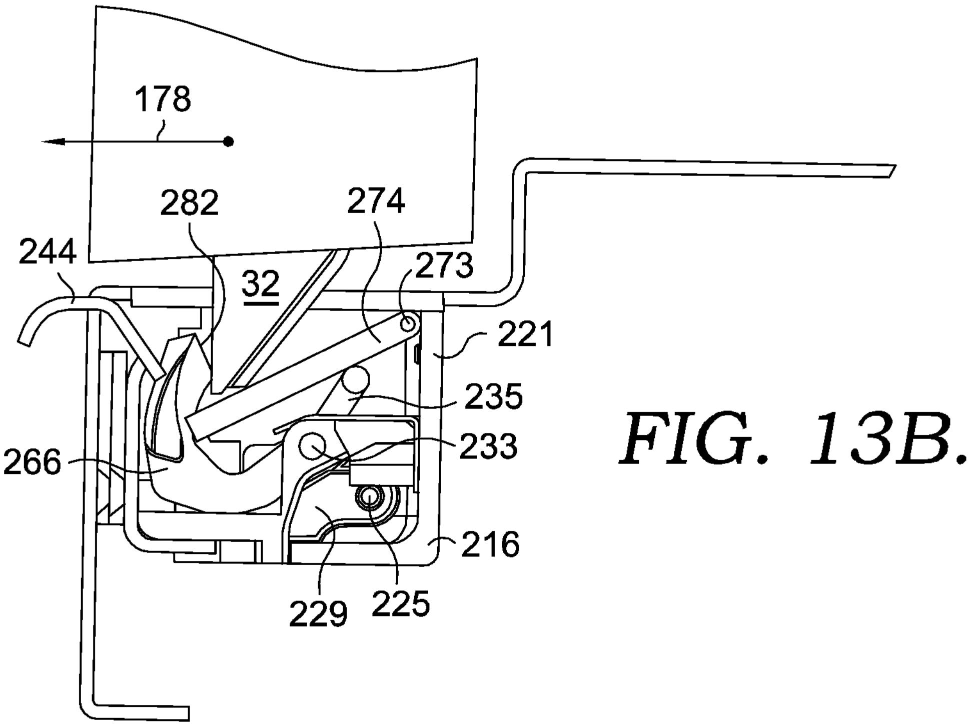
Figure 14:
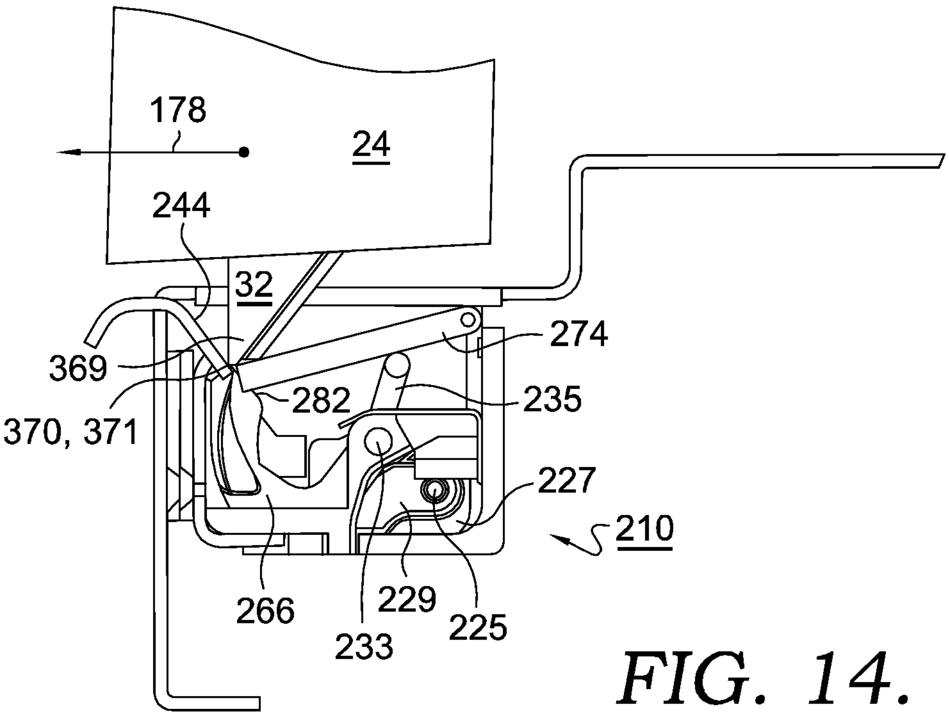
FIG. 14 is a third end view similar to those shown in FIGS. 12 and 13, showing the strike as the spring latch reaches the external ramp

Referring now to FIGS. 12 through 14, the sequence of actions of the various components is shown in proceeding from a fully locked position (FIG. 12) to a fully unlocked position (FIG. 14).

In FIG. 12, keeper 266 is in the spring latch locked position, which is fully rotated in a clockwise direction as shown in the figure. The plane of keeper face 282 is orthogonal to the initial opening direction 178 of door 24, which thereby serves to engage and lock spring latch 32 within entry chamber 218 of strike 210. Further, a supportive nose 284 on keeper 266 engages dead latch release platform 254 and maintains the platform in a position that keeps dead latch 34 in its depressed, disabling position, and retracted into door 24, thus preventing spring latch 32 from being unlocked. Keeper tang (not shown) is engaged by blocker 229, preventing keeper 266 from rotating counter clockwise about pins 233 in response to any opening force exerted in direction 178 on door 24.

Referring now to FIGS. 13A and 13B, blocker (not shown) has been retracted by solenoid plunger (not shown), thereby allowing keeper 266 to rotate counterclockwise about pins 233 in response to an opening force exerted by spring latch 32 on face 282 in direction 178. (In FIG. 13B, dead latch release platform 254 has been removed for clarity). Lifter actuation arm 235, which extends from keeper 266, urges lifter 274 to begin clockwise rotation about lifter pivot axis 273 which is above the midpoint of housing 216 and preferably near an outer corner 221. Because lifter 274 is initially in contact with spring latch 32 and is thus urged by lifter actuation arm 235, lifter 274 remains in substantially continuous contact with spring latch 32 and thus positively pushes spring latch 32 outward and onto external ramp 244. Concurrently, as keeper nose 284 (FIG. 13A) begins to rotate counterclockwise with keeper 266, dead latch platform 254 begins to rotate clockwise about axis 255. As a corner 287 of dead latch platform 254 clears the nose of dead latch 34, the spring associated with dead latch 34 urges dead latch 34 against face 289 of dead latch platform 254, forcing the dead latch platform still further out of the way so that the dead latch may rapidly enter entry chamber 218, which action completely releases spring latch 32.

Referring now to FIG. 14, the dead latch platform has again been removed for clarity. It is seen from FIG. 14 that further counterclockwise rotation of keeper 266 about pin 233 causes face 282 to become an extension of external ramp 244. Lifter 274 continues to rotate clockwise in continuous contact with spring latch 32 and thereby urges spring latch 32 onto external ramp 244. Further force applied to door 24 in direction 178 causes spring latch 32 to climb external ramp 244 and thereby become free of strike 210. Keeper spring 263 (FIG. 8) biases keeper 266 in the clockwise direction. After unlocking is complete, spring 263 serves to return keeper 266 clockwise and the associated components to their respective locking starting positions as shown in FIG. 12. The cycle is completed by re-extension of plunger 225 from solenoid 227 to place blocker 229 again in rotational interference with keeper tang 280, as shown in FIG. 10.

Referring again to FIG. 12, in locking of door 24 by spring latch 32 within door strike 210, door 24 is urged in a closing direction opposite to direction 178. Spring latch 32 and dead latch 34 climb external ramp 244 from the outside, and also climb over the nose 290 of keeper 266. As the nose of spring latch 32 clears keeper nose 290, the spring latch immediately extends from door 24 into entry chamber 218 and is trapped behind keeper face 282 as described above. Because the dead latch is prevented by dead latch platform 254 from entering chamber 218, spring latch 32 is effectively locked in strike 210.

Figure 15:
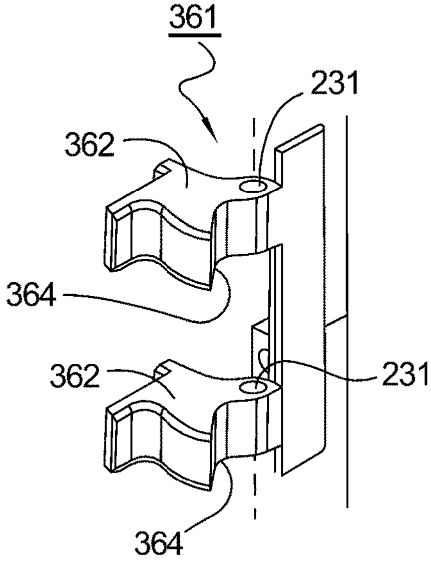
FIG. 15 is an isometric view of an alternate keeper bench, in accordance with the invention.

In another aspect of the invention, where it may not be necessary to directly lift the spring latch out of the entry chamber when the keeper is released, lifter subassembly 270 may be replaced by a stationary ramp internal to the entry chamber. The stationary ramp provides an inclined surface for the tip of the spring latch to first contact as the door is moved in an opening direction after the keeper is released. The internal ramp initiates the assent of the spring latch out of the entry chamber as the spring latch transitions from first making contact with the internal ramp, then with the keeper nose and finally with the external ramp. Referring first to FIG. 15, modified keeper bench 361 is shown. Keeper bench 361 is identical to keeper bench 261 but for the addition of internal ramp feature 362 including ramp surface 364. Keeper bench 361 is mounted to housing 216 similar to the mounting of keeper bench 261 to housing 216 and includes first and second journal bearings 231 for receiving first and second keeper pivot pins 233 (FIG. 8). Keeper 266 is pivotably mounted to keeper bench 361 on pins 233 (FIG. 8).

Figure 16:
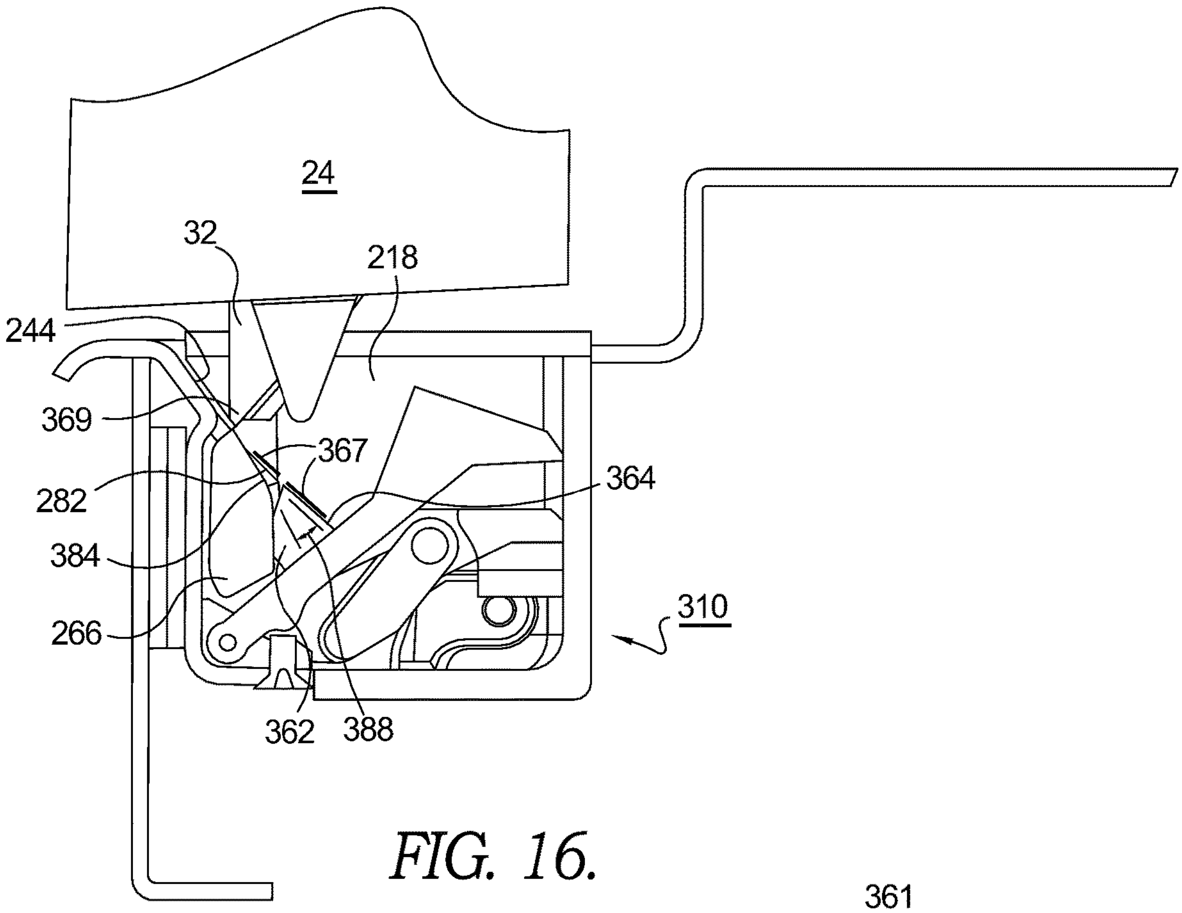
FIG. 16 is an end view of the strike, with the alternate keeper bench of FIG. 15, in accordance with the invention, with the door moved in an opening direction and the spring latch in contact with the external ramp.

FIG. 16 shows electric door strike 310 in accordance with this aspect of the invention after door 24 has moved in an opening direction and the tip 369 of extended spring latch 32 is about to first make contact with external ramp 244 and at a point where the spring latch 32 has partially ascended out of entry chamber 218 after tip 369 has left contact with keeper face 282. Note that, in FIG. 16, keeper 266 is in its unlatched, full counter-clockwise position and internal ramp surface 364, keeper face 282 and external ramp 244 are aligned to form a conjunctive ramp contact surface 367.

As shown in FIG. 16, to aid in the transition of spring latch 32 out of entry chamber 218, internal ramp surface 364 is disposed at a lesser angle than keeper face 282 and external ramp 244, with the angles measured in reference to the opening direction of the door. However, it is understood that internal ramp surface 364 may be aligned at the same angle as face 282 and ramp 244 to form ramp contact surface 367, or surface 364, face 282 and ramp 244 may each be at different angles to form contact surface 367. Also, as shown in FIG. 15, keeper bench 261 may include a pair of ramp features and ramp surfaces 362,364 to accommodate installed mortise-type locksets wherein the dead latch is above the spring latch or below the spring latch. Of course, since this aspect of the invention does not include lifter subassembly 270, lifter actuator arm 235 (FIG. 8) may be eliminated from keeper 366.

Turning once again to FIGS. 10, 14 and 16, another aspect of the invention is shown. Building codes require no more than a fifteen pound pull to open an unlatched door. To meet the maximum pull requirement by encouraging spring latch 32 to retract and to ascend smoothly out of entry chamber 218 once the keeper is rotated to its unlatched position, angularly disposed spring latch contact ridge 386 of keeper face 282 is provided (FIG. 10).

Keeper 266 includes keeper face 282 configured for providing a contact surface for spring latch 32 as described above. Second surface 384 of keeper 266 is recessed from keeper face 282. The plane of second surface 384 may be disposed at a non-parallel angle 388 with the plane of keeper face 282. Third surface 392 of keeper 266 provides a transition between keeper face 282 and second surface 384 forming spring latch contact ridge 386 between keeper face 282 and second surface 384. Contact ridge 386 generally runs at a non-perpendicular angle 396 with the axis of rotation 394 of keeper 266. As spring latch 32 ascends from entry chamber 218, angularly disposed latch contact ridge 386 provides a changing contact point 370 along lateral edge 371 (projecting into the page of FIG. 14) of tip 369 of the spring latch. That is, the contact point changes along lateral edge 371 of tip 369 as contact point 370 on tip 369 moves laterally across the length of lateral edge 371, because of the angularly disposed latch contact ridge 386. It is theorized that, since the contact point along the tip is changing as the spring latch exits the entry chamber, the tendency of tip 369 of spring latch 32 to dig-in and stick against keeper 266 as spring latch 32 exits entry chamber 218 is diminished, causing spring latch 32 to ascend smoothly out of the entry chamber.

In the embodiments described above, dead latch release subassembly 252 is shown having a particularly shaped dead latch release platform designed to cooperate with the particular dead latch shown. However, it is understood that, within the scope of the invention, the dead latch release platform can take on other shapes necessary to cooperate with the design and location of its associated dead latch.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An actuator-controlled electric strike for operating in conjunction with a spring latch of a lockset, wherein said lockset includes said spring latch and a dead latch, wherein said spring latch has an engaged position and a release position, and wherein said spring latch includes a tip having a lateral edge, said electric strike comprising:

a housing having an entry chamber defined therein; and a spring latch keeper disposed in said entry chamber for movement between a keeper locked position and a keeper unlocked position, wherein said spring latch keeper is rotatable about a keeper axis of rotation, and wherein said spring latch keeper includes:

a keeper face configured for abutting contact with said spring latch when said spring latch is disposed in said entry chamber and said spring latch is in said engaged position, wherein said keeper face is contactable by said tip of said spring latch, a second surface recessed from said keeper face, and a spring latch contact ridge positioned between said keeper face and said second surface, wherein said spring latch contact ridge is disposed at a non-perpendicular angle from said keeper axis of rotation, wherein said spring latch contact ridge is contactable by a contact point along said lateral edge of said tip of said spring latch as said spring latch keeper moves between said keeper locked position and said keeper unlocked position, and wherein said contact point changes along said lateral edge of said tip of said spring latch as said spring latch exits said entry chamber.

2. The actuator-controlled electric strike in accordance with claim 1 wherein said second surface is disposed on a first plane, wherein said keeper face is disposed on a second plane, and wherein said first plane is non-parallel relative to said second plane.

3. The actuator-controlled electric strike in accordance with claim 1 wherein said keeper face is a planar surface.

4. An actuator-controlled electric strike for operating in conjunction with a spring latch of a lockset disposed in a door, wherein said lockset includes said spring latch and a dead latch, wherein said spring latch has an engaged position and a release position, and wherein said spring latch includes a latch face, a ramp surface, and a tip having a lateral edge disposed between said latch face and said ramp surface, said electric strike comprising:

a housing having an entry chamber defined therein; and a spring latch keeper disposed in said entry chamber for movement between a keeper locked position and a keeper unlocked position, wherein said spring latch keeper is rotatable about a keeper axis of rotation, and wherein said spring latch keeper includes:

a keeper face configured for abutting contact with said latch face of said spring latch when said spring latch is disposed in said entry chamber and said spring latch is in said engaged position to maintain said door in a closed position relative to a door frame, wherein said keeper face is contactable by said tip of said spring latch, a second surface recessed from said keeper face, and a spring latch contact ridge positioned between said keeper face and said second surface, wherein said spring latch contact ridge is disposed at a non-perpendicular angle from said keeper axis of rotation, wherein said spring latch contact ridge is contactable by a contact point along said lateral edge of said tip of said spring latch as said spring latch keeper moves between said keeper locked position and said keeper unlocked position when said door is moved from said closed position toward an open position, and wherein said contact point changes along said lateral edge of said tip of said spring latch as said spring latch exits said entry chamber and said door is moved toward said open position.

5. The actuator-controlled electric strike in accordance with claim 4 wherein said second surface is disposed on a first plane, wherein said keeper face is disposed on a second plane, and wherein said first plane is non-parallel relative to said second plane.

6. The actuator-controlled electric strike in accordance with claim 4 wherein said keeper face is a planar surface.

* * * * *